May 13, 1930.  F. G. LILJENROTH  1,758,449
AMMONIUM SULPHATE MANUFACTURE
Filed Dec. 24, 1928
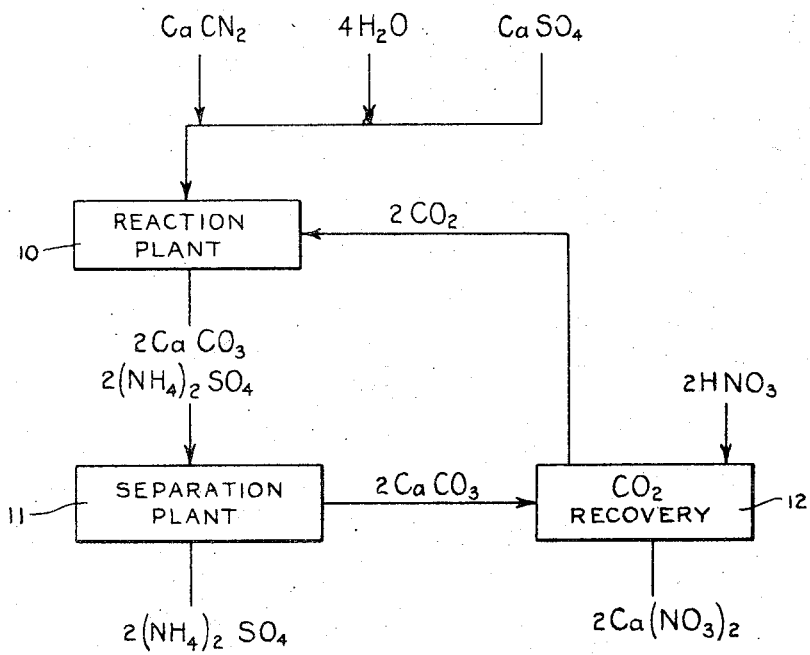
INVENTOR
FRANS. G. LILJENROTH.
ATTORNEY Patented May 13, 1930

1,758,449

UNITED STATES PATENT OFFICE

FRANS G. LILJENROTH, OF STOCKHOLM, SWEDEN, ASSIGNOR TO KUNSTDÜNGER-PATENT-VERWERTUNGS-AKTIENGESELLSCHAFT, OF GLARUS, SWITZERLAND, A CORPORATION OF SWITZERLAND

AMMONIUM-SULPHATE MANUFACTURE

Application filed December 24, 1928. Serial No. 328,280.

This invention relates to improvements in the manufacture of ammonium sulphate from calcium cyanamid. According to present methods this operation involves the derivation of ammonia from the calcium cyanamide and the reaction of the ammonia with sulfuric acid, or, in the preferred form, the reaction of the ammonia and carbon dioxide with calcium sulphate in aqueous suspension. The reactions involved are as follows:

(1) $CaCN_2 + 3H_2O = CaCO_3 + 2NH_3$ (2) $CaSO_4 + 2NH_3 + CO_2 + H_2O =$
$(NH_4)_2SO_4 + CaCO_3$.

According to commercial practice these reactions are carried out in four separate successive operations, each requiring special apparatus. These operations are:

1. Calcium cyanamid is treated with steam in autoclaves under high pressure and at high temperature.
2. The mixture of ammonia and steam discharged from the autoclaves is cooled and condensed as aqua ammonia.
3. The aqua ammonia is heated and the ammonia gas driven out.
4. The ammonia gas is introduced into a bath of sulfuric acid, or, together with carbon dioxide, into calcium sulphate suspended in water.

It will be noted that this method involves the handling of gaseous ammonia, with its well known drawbacks. Furthermore, it has been found that reaction (1) takes place too slowly for commercial success unless the water is introduced in the form of steam. Likewise, as Equation (1) under these conditions includes a gaseous constituent in each side of the equation, it is necessary in accordance with the law of mass action to employ a substantial excess of steam in order to carry the indicated reaction sufficiently close to completion for commercial purposes.

According to the present invention the entire operation of obtaining ammonium sulphate from calcium cyanamid is carried out in a single step instead of in four steps as has been necessary heretofore. This step comprises direct reaction between calcium cyanamid and carbon dioxide in the presence of calcium sulphate and water, producing the following reaction.

(3) $CaCN_2 + CaSO_4 + CO_2 + 4H_2O =$
$2CaCO_3 + (NH_4)_2SO_4$.

This operation not only reduces the four steps heretofore required to a single step, but has substantial dditional advantages. When operating in accordance with this invention only one gas takes part in the reaction, carbon dioxide being consumed and no ammonia gas being evolved because the ammonia is immediately combined with the $SO_4$ of the $CaSO_4$ to produce ammonium sulphate. The result is that as the reaction indicated by Equation (3) is a one gas reaction, the excess of $H_2O$ is not necessary and large quantities of steam are saved. Likewise it is possible to carry out the reaction by the use of water in the liquid phase instead of steam.

One preferred method of carrying out this invention is illustrated in the accompanying drawings which comprise a diagrammatic flowsheet of the various operations. The calcium cyanamid, calcium sulphate and water, all of which may be mixed before introduction to form a slurry, are fed into the reaction plant 10, where they are treated with carbon dioxide gas to produce calcium carbonate and ammonium sulphate in accordance with Equation (3). These products are discharged into a separation device 11, such as a thickener, where the ammonium sulphate solution is separated from the calcium carbonate. The calcium carbonate may be conveyed to a carbon dioxide recovery plant 12 where it is treated with nitric acid to produce carbon dioxide which is returned to the reaction plant 10, the residual calcium nitrate produced thereby being of commercial value, particularly as a fertilizer.

Because of the fact that during the first step of the present method as indicated above one gas (steam) is consumed and another gas (ammonia) is evolved during the derivation of ammonia from calcium cyanamid by means of steam, it is impractical to carry out this step continuously. It therefore is usually operated as a batch process, the autoclaves being charged with cyanamid and steam thereafter supplied. When the reaction after a certain period of time is completed, the mixture of ammonia and steam is withdrawn and condensed and the calcium carbonate sludge discharged. In the process according to the present invention only one gas (carbon dioxide) takes part in the reaction, and therefore the entire operation can readily be carried out by continuous methods.

In case the calcium sulphate is supplied in the form of a sludge, such for instance as that produced in connection with the leaching of phosphate rock with various reagents, calcium cyanamid is advantageously added to the sludge before it is introduced into the reaction vessel. The carbon dioxide required to carry out the reaction can be obtained from the calcium carbonate produced by the reaction, either by thermal decomposition (producing lime or cement as a byproduct) or by treatment with an acid, preferably nitric acid. It is also possible to use carbon dioxide in the form of flue gas.

In case the calcium carbonate obtained in the aforesaid process is dissolved in nitric acid it is advantageous to leave a certain amount of the ammonium sulphate solution with the calcium carbonate. This ammonium sulphate will react with part of the calcium nitrate formed to give ammonium nitrate and calcium sulphate. The calcium nitrate produced will thus contain a certain amount of ammonium nitrate which raises the nitrogen content and improves the physical properties of the product.

It is not necessary, but in certain cases it is advantageous to carry out the reaction given in Equation (3) under pressure. If the carbon dioxide is obtained from the calcium carbonate by treatment with an acid, this operation can be carried out under slight pressure and the carbon dioxide evolved can be supplied directly to the main reaction vessel without the use of blowers or compressers.

If it is desired to obtain the entire ammonia content in the form of ammonium sulphate, the equivalent amount of calcium sulphate should of course be employed. The invention however contemplates also an operation in which some of the ammonia is desired in the form of free ammonia, which of course involves the use of less than the equivalent amount of calcium sulphate necessary for complete reaction with the calcium cyanamid.

Claims:

1. A process for the production of ammonium sulphate from calcium cyanamid in which the ammonium sulphate is produced in a single operation involving the reaction of calcium cyanamid, water, and a sulfur compound adapted to react with ammonia to form ammonium sulphate.

2. A process for the production of ammonium sulphate from calcium cyanamid, in which calcium cyanamid, calcium sulphate, carbon dioxide and water react to form ammonium sulphate in a single operation.

3. A process as set forth in claim 2 in which the water is used in the liquid phase.

4. A process as set forth in claim 1 in which the reaction is carried on continuously by continuous introduction of the reagents and continuous withdrawal of the products.

5. A process as set forth in claim 1 in which the reaction is carried out at a pressure above atmospheric pressure.

6. A process as set forth in claim 1 in which the reaction is carried on at an elevated temperature.

7. A process as set forth in claim 2 in which the calcium cyanamid, calcium sulphate and water are mixed to form a slurry, and carbon dioxide is passed through the slurry.

8. A process as set forth in claim 2 in which calcium cyanamid is mixed with a slurry of calcium sulphate and water and carbon dioxide is passed into the mixture.

9. A process as set forth in claim 2 in which less than the equivalent proportion of calcium sulphate necessary to react completely with the calcium cyanamid is employed.

10. A process as set forth in claim 2 in which the calcium carbonate produced by the primary reaction is treated to obtain carbon dioxide which is returned to the primary reaction.

11. A process as set forth in claim 2 in which the calcium carbonate produced by the primary reaction is treated with nitric acid to obtain calcium nitrate and carbon dioxide, the carbon dioxide being returned to the primary reaction.

12. A process as set forth in claim 2 in which the calcium carbonate produced by the primary reaction is treated to produce carbon dioxide under pressure, and the pressure is utilized to return the carbon dioxide directly to the primary reaction.

13. A process as set forth in claim 2 in which part of the ammonium sulphate solution is left with the calcium carbonate produced by the reaction and the mixture subsequently treated with nitric acid.

In testimony whereof I affix my signature.

FRANS G. LILJENROTH.